(12) United States Patent
Zhang et al.

(10) Patent No.: US 11,294,020 B2
(45) Date of Patent: Apr. 5, 2022

(54) ELECTROMAGNETIC VECTOR SENSOR NOISE MITIGATION

(71) Applicant: Quasar Federal Systems, San Diego, CA (US)

(72) Inventors: Yongming Zhang, San Diego, CA (US); Robert Dickey, Poway, CA (US)

(73) Assignee: QUASAR FEDERAL SYSTEMS, San Diego, CA (US)

( * ) Notice: Subject to any disclaimer, the term of this patent is extended or adjusted under 35 U.S.C. 154(b) by 425 days.

(21) Appl. No.: 16/298,358

(22) Filed: Mar. 11, 2019

(65) Prior Publication Data

US 2019/0280724 A1 Sep. 12, 2019

Related U.S. Application Data

(60) Provisional application No. 62/640,953, filed on Mar. 9, 2018.

(51) Int. Cl.
| | | |
|---|---|---|
| *G01S 3/02* | (2006.01) | |
| *H04B 1/12* | (2006.01) | |
| *G01S 3/14* | (2006.01) | |
| *G01S 3/78* | (2006.01) | |
| *G01S 3/802* | (2006.01) | |

(52) U.S. Cl.
CPC .............. *G01S 3/023* (2013.01); *G01S 3/143* (2013.01); *G01S 3/78* (2013.01); *G01S 3/8027* (2013.01); *H04B 1/123* (2013.01)

(58) Field of Classification Search
None
See application file for complete search history.

(56) References Cited

U.S. PATENT DOCUMENTS

| | | |
|---|---|---|
| 6,922,059 B2 | 7/2005 | Zank et al. |
| 10,082,546 B2 | 9/2018 | Hibbs et al. |
| 2008/0122424 A1* | 5/2008 | Zhang ................ G01R 29/0842 324/72 |
| 2017/0363705 A1* | 12/2017 | Parent ..................... G01S 19/47 |

* cited by examiner

*Primary Examiner* — Whitney Moore
(74) *Attorney, Agent, or Firm* — Diederiks & Whitelaw, PLC.

(57) ABSTRACT

A radio receiver is made much more immune to jamming signals. A vector EM sensor, in a 2-dimensional (3-axis sensor) or 3-dimensional (6-axis sensor) sensor configuration, is combined with a unique digital rotation to a preferred direction to create a new reference channel and, using an advanced frequency domain noise mitigation algorithm or other noise cancellation algorithm, can effectively reject jamming and other interference signals and improve the signal-to-noise ratio (20-40 dB) and the receiving performance of the receiver. The method can cancel both near-field and far-field interference and improve accuracy for various applications concerned with establishing the direction, or bearing, to a source. A communication receiver with the vector sensor and the cancellation algorithm has unique anti-jamming capabilities even for multiple jamming sources.

24 Claims, 6 Drawing Sheets

ELECTROMAGNETIC VECTOR SENSOR NOISE MITIGATION

CROSS REFERENCE TO RELATED APPLICATIONS

This application claims the benefit of U.S. Provisional Application No. 62/640,953, which was filed on Mar. 9, 2018 and titled "Electromagnetic Vector Sensor Noise Mitigation". The entire content of this application is incorporated herein by reference.

GOVERNMENT LICENSE RIGHTS

This invention was made with government support under Contract FA8650-15-C-7530 awarded by the Air Force. The government has certain rights in the invention.

FIELD OF THE INVENTION

The present invention pertains to measurements of signals using electromagnetic vector sensors and, in particular, a method to reduce the noise or interference present in said measurements through intrinsic properties of the electromagnetic vector sensor.

BACKGROUND OF THE INVENTION

An electromagnetic vector sensor comprises three electric field sensors and three magnetic field sensors arranged to simultaneously measure three orthogonal components of the electric field and the magnetic field at a common point in space. Such an electromagnetic vector sensor is thus capable of measuring all of the information present in the electromagnetic field. In a typical example of a vector sensor, the magnetic field sensors are constructed from loop antenna elements and the electric field sensors are constructed from dipole antenna elements. The antenna elements are arranged with a common center point such that the field measurements are made at a location that is equivalent for all of the elements. In addition, the antenna elements are oriented such that each axis is perpendicular to the other two axes for a given sensor type. In such a manner, the vector sensor simultaneously measures the electric field vector E and the magnetic field vector B at a given point in space.

Vector sensors are commonly used for direction finding (DF) and geolocation applications because the information gained from the vector sensor can be used to form the Poynting vector, $$\vec{S} = \frac{1}{\mu_0} \vec{E} \times \vec{B},$$

which is the vector cross product of the electric and magnetic field vectors and which is a vector that points in the direction of energy flow in the electromagnetic field. In the case of a radiating emitter, such as a communications transmitter, the direction of the Poynting vector is radially away from the emitter location if the sensing is done in the far field region. The negative of the Poynting vector, $-\vec{S}$, points directly at the emitter location, and thus measurement of the Poynting vector provides a simple estimate of the direction to the emitter location. An airborne vector sensor can be used with terrain information to geolocate an emitter transmitting from the ground.

The components of a vector sensor can be used individually or in combination for most, if not all, of the same applications as traditional antennas. For example, the dipole antenna element used in an electric field sensor that is part of a vector sensor can be designed to be quite similar to a dipole antenna used for a communications application. Consequently, the vector sensor can be used to receive communications or other signals of interest and, by using the unique properties of vector sensors, optimize the reception of the signal of interest in a manner that a traditional antenna is not capable of performing.

A problem with all signal receivers, and thus a principal impediment to receiving a signal of interest, is noise. There are several sources of noise that can contaminate the signal received by a receiver. The intrinsic noise produced by the electronic components within the receiver limits the ultimate performance of the receiver. Extrinsic noise, which is noise that originates outside of the receiver, can also serve to limit the performance of the receiver to the extent to which it is combined with the signal of interest. Extrinsic noise sources can include natural environmental noise and man-made environmental noise sources or so-called interference signals. These noise sources may be unique to the measurement location and can differ from location to location.

One of the problems with transmitting and receiving signals on the battlefield is the presence of jamming signals. The jamming signals are intentionally transmitted by an adversary to disrupt signal reception by friendly forces. If significant jamming power is transmitted by the adversary, a traditional communications receiver will be unable to separate the jamming signal from the signal of interest.

Based on the above description, there exists a need for an RF signal measurement system that is immune from jamming or other interfering signals, thereby enabling an optimal reconstruction of the originally transmitted signal. Applications of significant military and commercial interest exist to enable the ability to receive a signal of interest in a noisy or jammed environment that are not capable of being realized with existing methods. In addition, such an RF signal measurement system that is not limited by the effects of external noise or jamming sources would enable new applications that have not yet been conceptualized.

SUMMARY OF THE INVENTION

One preferred attribute of the vector sensor that is employed in the present invention is the orthogonal geometrical arrangement of the individual sensing axes. Specifically, the sensor axes are arranged to acquire orthogonal components of the electric or magnetic field. Another preferred attribute of the vector sensor is the measured amplitude of each component is given by the Cosine(theta)-dependence, where theta is the angle between the measured E- or B-field vector and the axis of the sensor component.

The invention comprises a three-step process. First, the vector sensor is used to acquire the signals that are present at two or more orthogonal sensor axes. The vector sensor outputs can be used to determine a preferred direction if the preferred direction is not known in advance. Second, the measured signals are rotated digitally using a rotation matrix to create a reference channel that is aligned in the preferred direction. Third, the reference channel is used along with a noise cancellation algorithm for canceling noise or interference in the primary (signal of interest) channel(s). The frequency domain interference mitigation (FDM) algorithm is very effective at cancelling broadband or multi-tone interference signals, using the reference channel to cancel the interference signal in the primary channel in the frequency domain but maintaining the desired signal. The interference can be either near-field signals or far-field signals.

The primary advantage of the invention is that it enables a unique method of noise or interference cancellation or rejection that is not available from traditional antennas. An example of the use of this invention is in the area of anti jamming technology. The vector sensor can receive a signal in the presence of multiple jamming sources and, through this innovative method, eliminate the effect of the jammers.

The invention applies to a system and method to measure electromagnetic signals for a variety of purposes including but not limited to communications; position, navigation, and timing; and direction finding and geolocation, among many examples.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art to employ the present invention.

Figure 1:
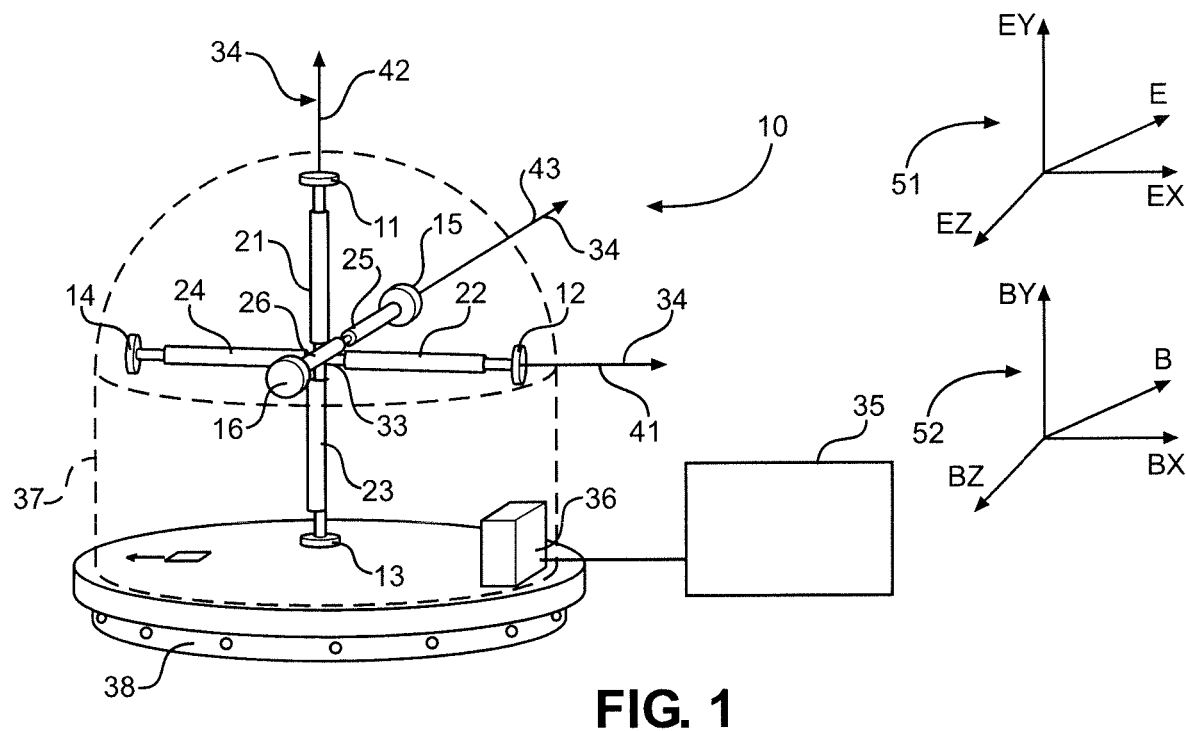
FIG. 1 is a perspective view of an electromagnetic vector sensor of the present invention.

FIG. 1 is a perspective view of an electromagnetic vector sensor 10 of the present invention. Vector sensor 10 comprises electric-field sensors 11-16 and magnetic-field sensors 21-26 collocated around a central measurement point 33 and oriented so as to acquire signals along orthogonal axes 34. Vector sensor 10 further comprises a controller 35, which is preferably a control and processing unit connected to a multi-channel preamplifier, and a signal conditioning board 36, an environmental enclosure 37 that is transparent for the measured signal to pass through, and an optional non-conductive plate 38 to support sensor 10. More details regarding another exemplary electromagnetic vector sensor that can be used with the present invention are included in U.S. Pat. No. 10,082,546, which is incorporated herein by reference.

One preferred attribute of vector sensor 10 that is employed in the present invention is the orthogonal geometrical arrangement of individual sensing axes 41-43. Specifically, sensor axes 41-43 are arranged to acquire orthogonal components $E_x$, $E_y$ and $E_z$ of the electric field E shown at 51 or orthogonal components $B_x$, $B_y$ and $B_z$ of the magnetic field B shown at 52. Another preferred attribute of vector sensor 10 is the measured amplitude of each component is given by the Cosine(theta)-dependence, where theta is the angle between the measured E- or B-field vector and the axes 41-43 of the sensor component (11-16 or 21-26). For purposes of the present invention, a "vector sensor" is defined as a vector sensor where the measured amplitude of each component is given by the Cosine(theta)-dependence and theta is the angle between the measured E- or B-field vector and the axis of the sensor component.

Figure 2:
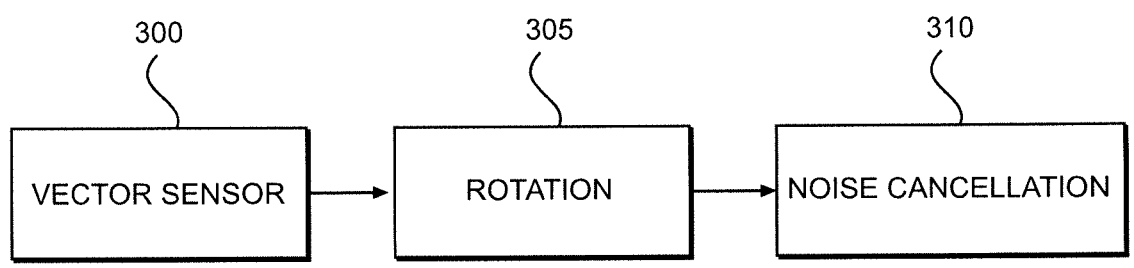
FIG. 2 is a noise cancellation/mitigation method flowchart that describes the steps employed to optimize reception of the signal of interest using the method of the present invention.

The invention comprises a three-step process. Specifically, FIG. 2 is a noise cancellation/mitigation method flowchart that describes the steps employed to optimize reception of the signal of interest using the method of the present invention. First, at step 300, the vector sensor is used to acquire signals 51, 52 that are present at two or more orthogonal sensor axes 41-43. Vector sensor 10 outputs can be used to determine a preferred direction if the preferred direction is not known in advance. Second, at step 305, measured signals 51, 52 are rotated digitally using a rotation matrix to create a reference channel that is aligned in the preferred direction. Third, at step 310, the reference channel is used along with a noise cancellation algorithm for canceling noise or interference in the primary (signal of interest) channel(s). The frequency domain interference mitigation (FDM) algorithm is very effective at cancelling broadband or multi-tone interference signals, using the reference channel to cancel the interference signal in the primary channel but maintaining the desired signal. Preferably, the second and third steps are performed by controller 35 that is in communication with vector sensor 10.

Figure 3:
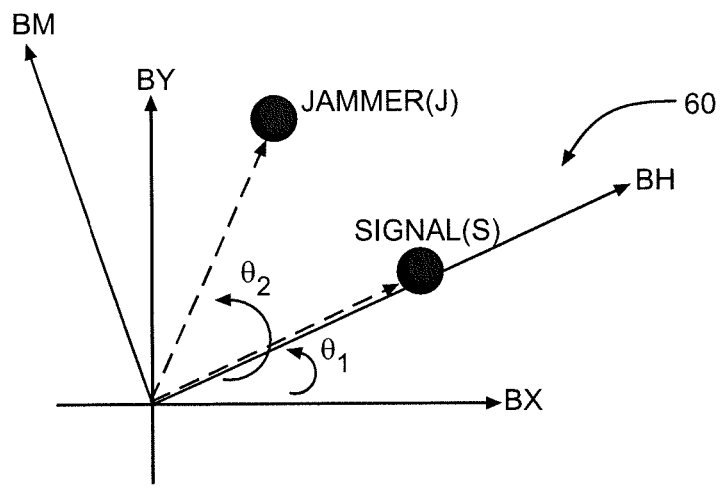
FIG. 3 depicts an application scenario wherein a signal of interest S is disrupted from being received by application of an adversary's jamming signal J.

There are several cases where this method is beneficial. As shown in FIG. 3, assume that a communications signal S is the signal of interest and a jamming signal J is the source of interference in a two-dimensional geometry 60 with vector sensor axes Bx and By. This example represents a typical case for a ground vehicle-based communication receiver when it is in the far field of the communications transmitter, and where the EM waves at the receiver are horizontal magnetic fields and vertical E-fields. Further assume the B-field direction for the communications signal is at angle theta1 (θ1) with respect to a horizontal reference Bx and the direction for the jamming B-field signal is at angle theta2 (θ2) with respect to the horizontal reference Bx, as shown in FIG. 3. FIG. 3 depicts an application scenario wherein a signal of interest S is disrupted from being received by application of an adversary's jamming signal J. A location of the origin of the signal of interest is known, or the direction to the adversary's jamming transmitter can be determined using vector sensor 10.

In the first step, the two (or more)—axis vector sensor 10 collects signals on the orthogonal Bx and By axes. Since vector sensor 10 is not preferentially oriented at this step, each axis collects both the communications signal (S) as well as the jamming signal (J). The following expressions describe the signals collected at this step:

$Bx = J\cos(theta2) + S\cos(theta1)$ $By = J\sin(theta2) + S\sin(theta1)$

In the first case, assume the direction to the source of the communications signal is known. During the second step (rotation), the signals Bx and By are rotated into Bh and Bm, where Bh and Bm are a new set of orthogonal axes. Bh is chosen to be aligned with the direction to the communications signal source. This step places the maximum amount of communications signal on the Bh axis. The other sensor axis, Bm, contains minimal amounts of the communications signal (it only retains the jamming signal). The rotated signals are defined as follows:
[Bh, Bm]=R(θ)×[Bx, By]; where R is the two dimensional rotation matrix:

$$R = \begin{bmatrix} \cos\theta & \sin\theta \\ -\sin\theta & \cos\theta \end{bmatrix}$$

In this case, θ=θ1. Consequently, $Bh = Bx\cos(theta1) + By\sin(theta1)$;

and $Bm = -Bx\sin(theta1) + By\cos(theta1)$.

In this case, the Bm channel does not contain (in principle) or only contains a minimal amount of the desired signal (the communication signal for the example here) but will contain the jamming signals from a single jammer or multiple jammers from different directions, assuming the direction of the jammers is not at the same direction as the desired signal. The Bh channel contains both the desired signal and jamming signals or interference.

During the third step (noise cancellation), the interference on the Bh channel is canceled using the Bm channel as the reference. The frequency domain interference mitigation algorithm works well when the scaling factors for the interference signals between the primary channel and the reference channel are frequency dependent. This is a situation in which a simple cancellation in the time domain with a reference channel would not work well.

Figure 4:
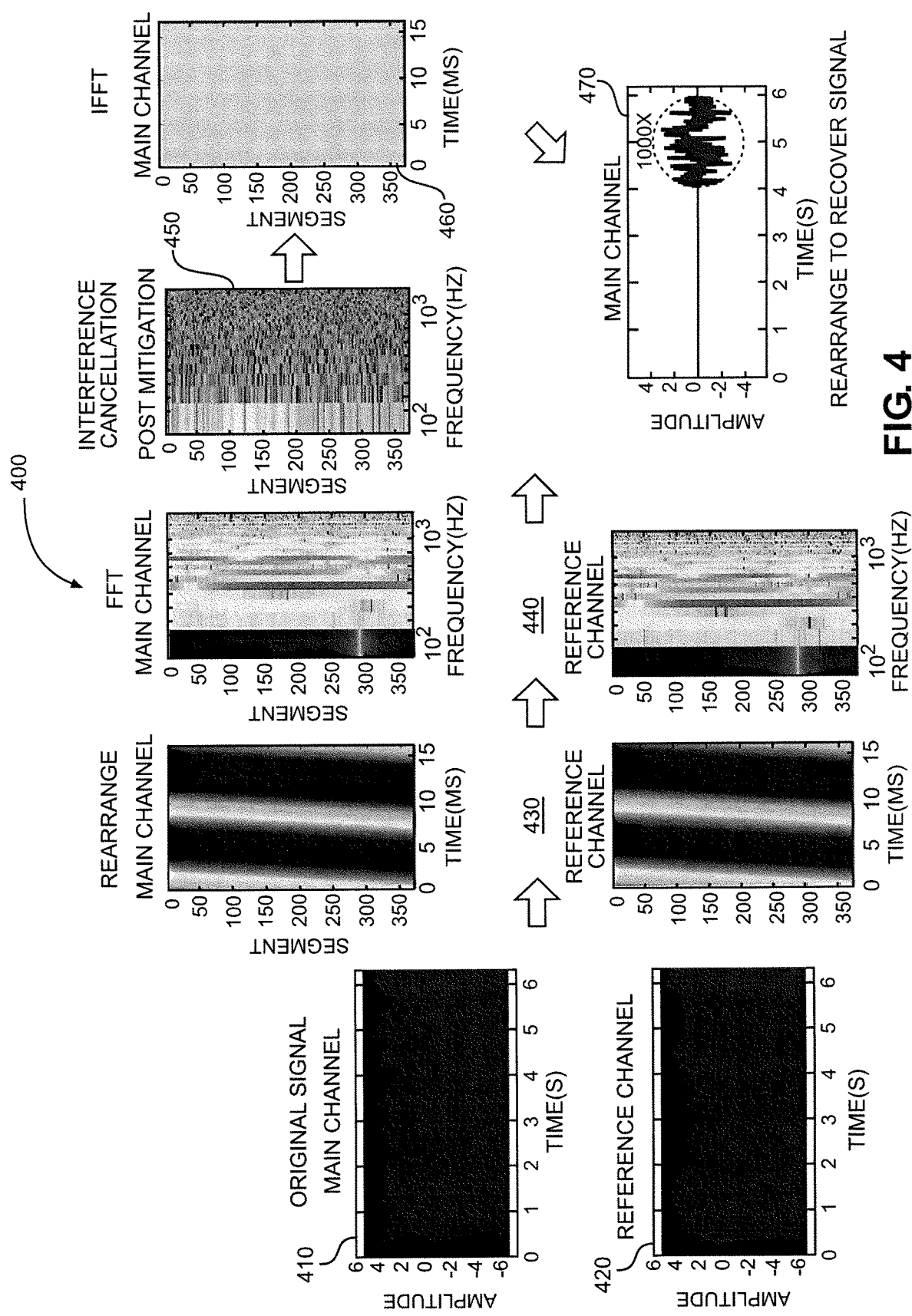
FIG. 4 shows the processing steps for Frequency Domain Cancellation.

FIG. 4 shows the processing steps for a Frequency Domain Cancellation method 400. FFT represents Fast Fourier Transform, and IFFT represents Inverse Fast Fourier Transform. An original signal in the time domain (of six seconds in length for example) is obtained on a main channel 410, representing a combined signal and noise component, and an identical-length signal, also in the time domain, is obtained on a reference channel 420, representing a noise component. Each of the two signals is decomposed into a number of 16-millisecond-long segments, for example, at step 430, and the segments are ordered to preserve the time-ordering. A Fast Fourier Transform (FFT) is performed at step 440 on each segment individually in both the main channel group of segments and the reference channel group of segments, resulting in a frequency domain representation of each signal. The frequency resolution of the FFT is determined by the length of the segments chosen. The correlation between the main channel and the reference channel is determined for each individual frequency bin by evaluating the correlation on the main channel and reference channel across all segments at the same frequency bin. Weighting coefficients for each frequency bin are then computed to maximize cancellation when subtracting the reference channel from the primary channel in the frequency domain at step 450. In step 460, the method 400 uses Inverse Fast-Fourier-Transform (IFFT) to convert the frequency domain main channel segments after cancellation back to the time domain if needed. Since the time-ordering of the segments was preserved, the time domain segments can be rearranged to reconstruct the main channel signal, absent the noise, at step 470. The principles of the approach are:

Signal on channel of interest S0 contains desired signal D and interference signal I, S0=D+I+noise (where noise is the sensor internal noise);

Signal on the reference channel SR contains the interference signal multiplied by scaling factor α, SR=αI+noise; and If we find α, the signal D can be computed as D=S0−(SR/α)+noise.

The scaling factor α can be found as a solution to a linear regression problem that minimizes the correlation between the main and reference channels (in the frequency domain). The processing steps are shown in FIG. 4. The algorithm works well for broadband time-domain data, narrow band time-domain data, or I/Q data down-converted to the baseband.

In the second case, assume the direction to the source of the communications signal is not known, but the direction to the source of the jamming signal can be determined (for example, J>>S). In this case, Bm is aligned to the maximum jamming signal (Bm=J), and Bh is orthogonal to Bm. Bh contains both the communications signal and the jamming signal (Bh=S+J). Bm is used as the reference channel to cancel interference on Bh, thereby improving the signal-to-noise ratio of the communications signal detected and rejecting the interference.

This method of noise cancellation works in the general three-dimensional case where vector sensor 10 is used to receive all six components of the electromagnetic field as well as in a reduced, two-dimensional case, where only two orthogonal B-field components are used depending on the geometry of the problem.

Before the rotation step, the collected signal on each axis should be cleaned using 1) digital filters to remove power line and other large interferences, and 2) blanking to remove impulse interference data, such as sferics, using a threshold.

The rotation angle can be 1) determined automatically by using the DF method to determine the angle of the signal and sensor axes, or 2) manually input by a user.

Figure 5:
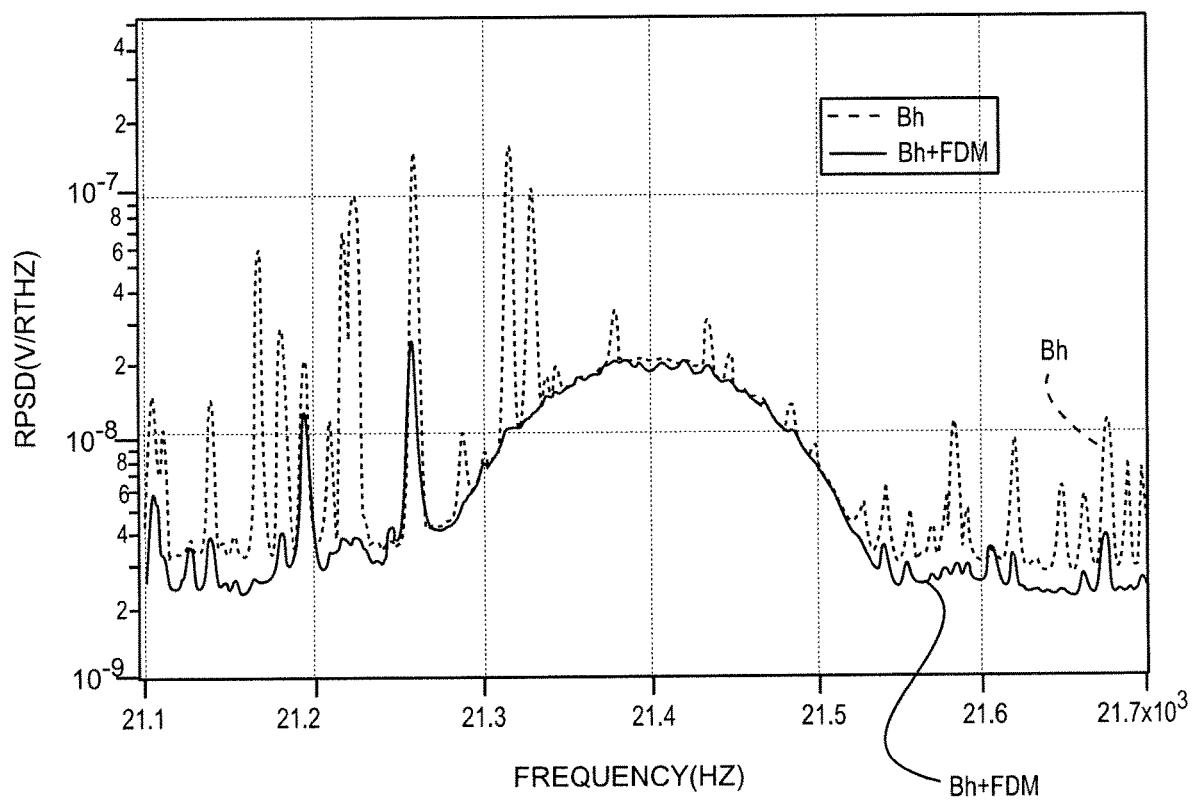
FIG. 5 is a frequency domain plot of a signal and a noise source that interferes with the signal (Bh) as well as a final plot showing the recovery of the signal of interest (Bh+FDM) after vector sensor noise mitigation processing.

FIG. 5 demonstrates the usefulness of the method of the present invention by showing a frequency domain plot of a signal and a noise source that interferes with the signal (Bh) as well as a final plot showing the recovery of the signal of interest (Bh+FDM) after vector sensor noise mitigation processing.

Figure 6:
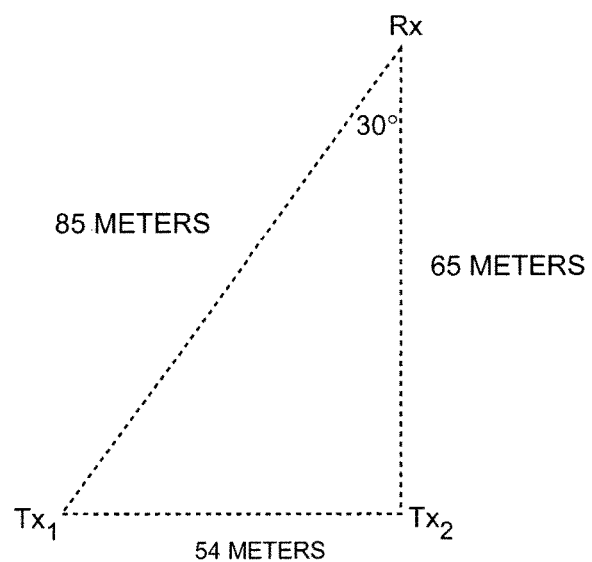
FIG. 6 shows an outdoor test configuration with a vector sensor location Rx and two transmit locations Tx1 and Tx2 at angular positions 30 degrees apart.

FIG. 6 shows an outdoor test configuration with a vector sensor location Rx and two transmit locations Tx1 and Tx2 at angular positions 30 degrees apart. Two orthogonal horizontal magnetic sensors B1 and B2 are located at Rx.

Figure 7:
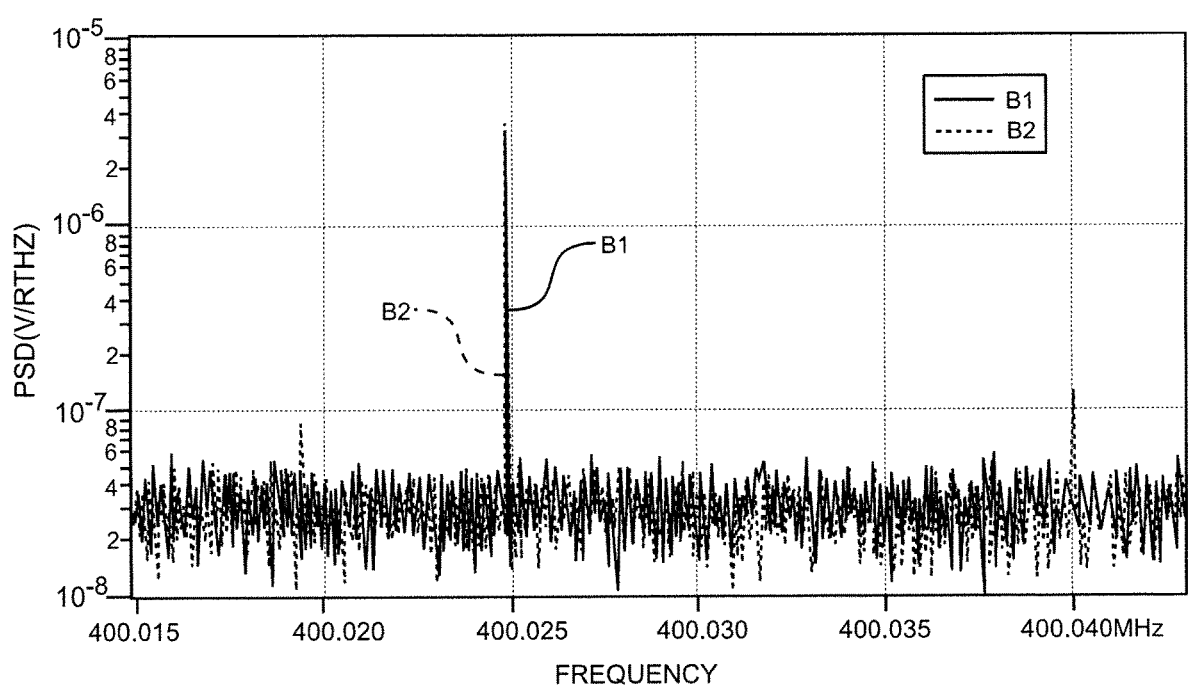
FIG. 7 is a frequency spectrum showing the narrow band signal of interest received from Tx1 by both sensors B1 and B2 with no jamming signal present.

FIG. 7 is a frequency spectrum showing the narrow band signal of interest received from Tx1 by both sensors B1 and B2 with no jamming signal present.

Figure 8:
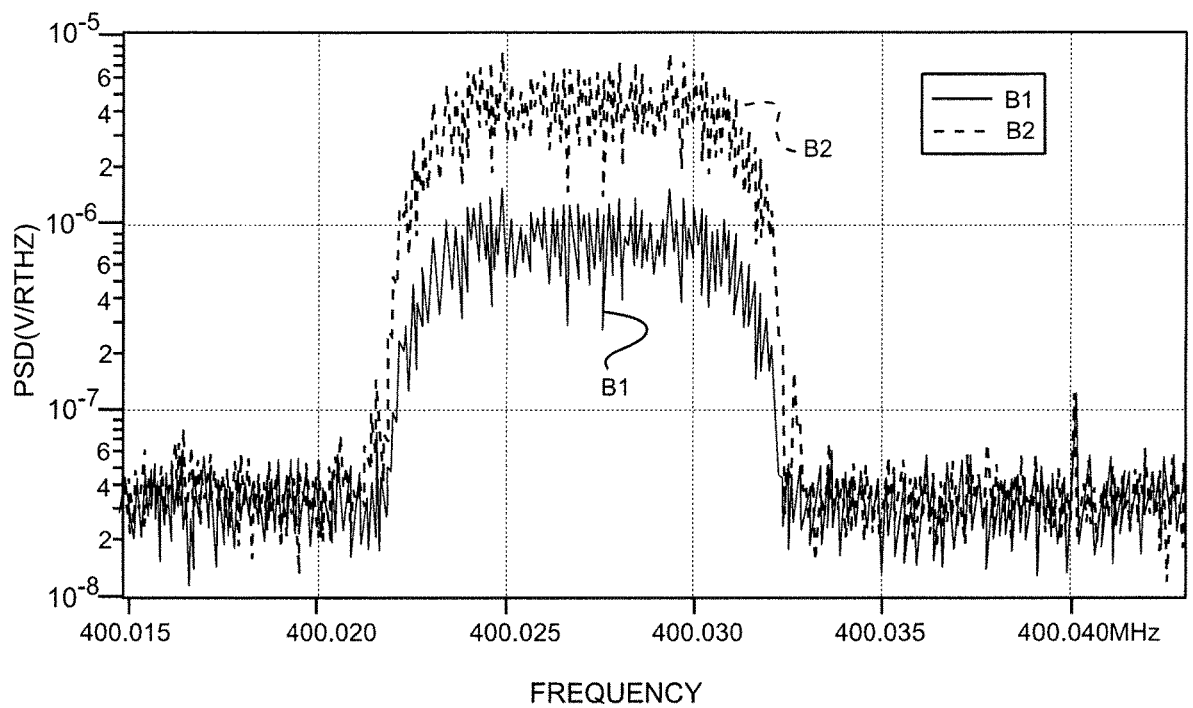
FIG. 8 is a frequency spectrum showing the broad band jamming signal received from Tx2 by both sensors B1 and B2.

FIG. 8 is a frequency spectrum showing the broad band jamming signal received from Tx2 by both sensors B1 and B2. The signal of interest from Tx1 is present but not visible in the spectrum.

Figure 9:
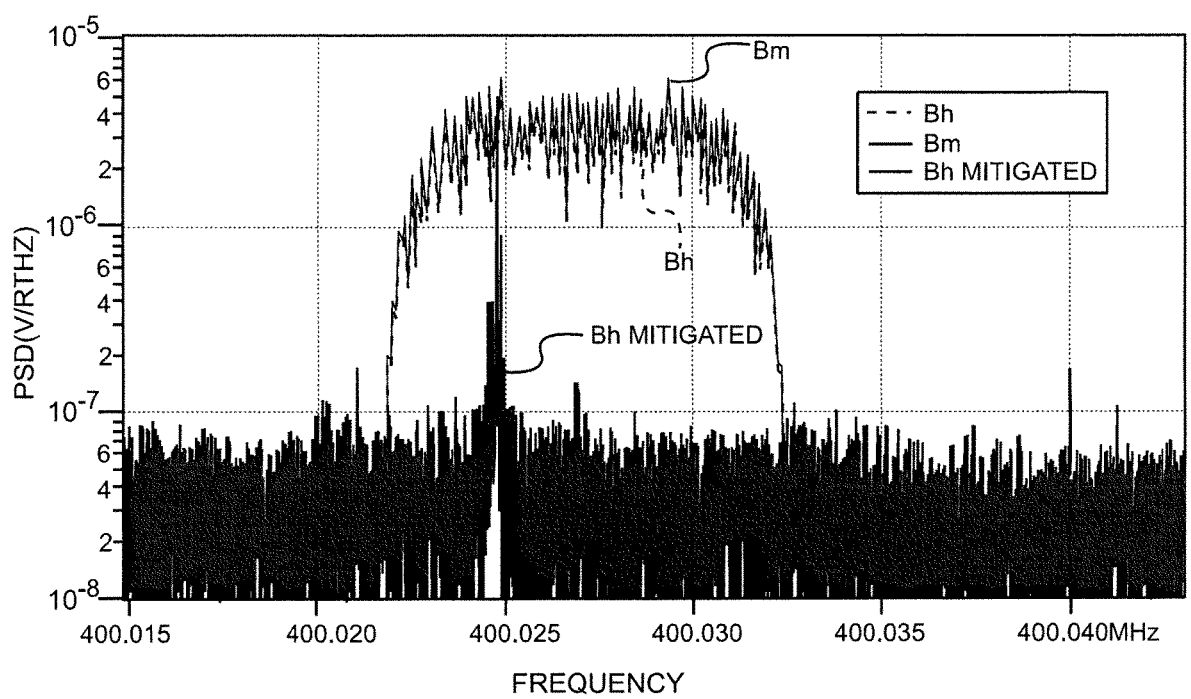
FIG. 9 shows the received frequency spectrum after rotation of B1 and B2 into Bh and Bm.

FIG. 9 shows the received frequency spectrum after rotation of B1 and B2 into Bh and Bm. The spectrum of Bh after mitigation (Bh mitigated) clearly shows the signal of interest from Tx1.

Figure 10:
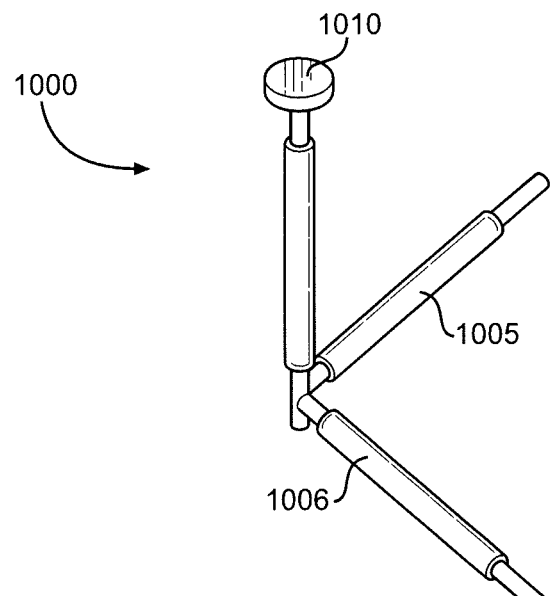
FIG. 10 is a perspective view of a second electromagnetic vector sensor of the present invention.
Figure 11:
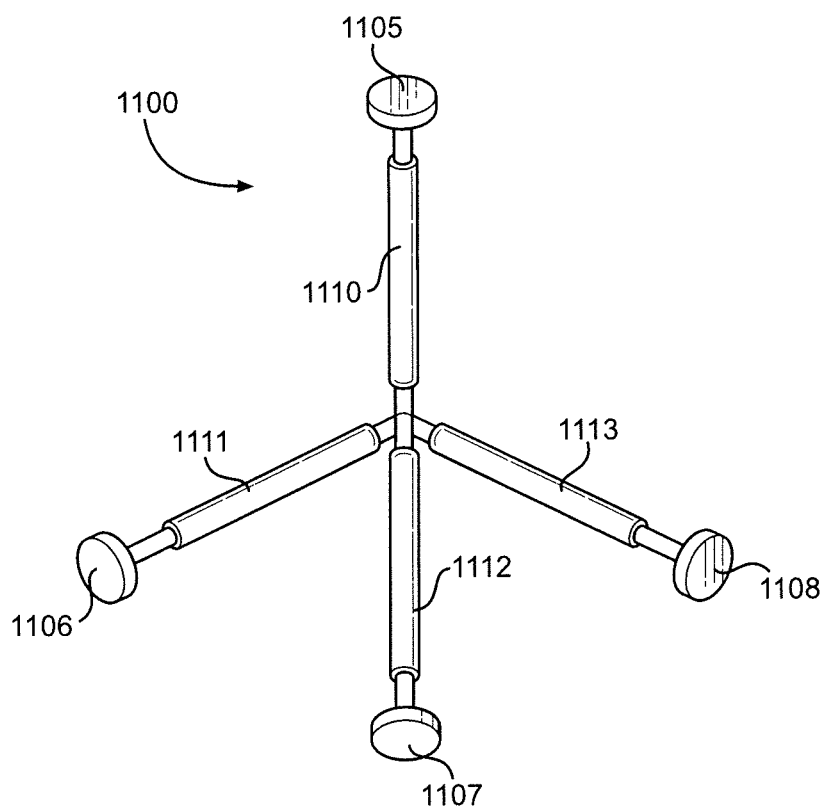
FIG. 11 is a perspective view of a third electromagnetic vector sensor of the present invention.

While one particular vector sensor has been illustrated in FIG. 1, it should be recognized that a variety of different vector sensors can be used with the present invention. Additional vector sensor arrangements are shown in FIGS. 10 and 11, although the ancillary structures are not depicted (e.g., signal conditioning, enclosures, etc.). In FIG. 10, a vector sensor 1000 includes magnetic-field sensors 1005 and 1006 and an electric-field sensor 1010. Sensors 1005, 1006 and 1010 are arranged along orthogonal axes. Also, sensors 1005, 1006 and 1010 do not have co-located axes. In FIG. 11, a vector sensor 1100 includes electric-field sensors 1105-1108 and magnetic-field sensors 1110-1113. Sensors 1105-1108 and 1110-1113 are arranged along non-orthogonal axes. Certain of the sensors have co-located axes, e.g., electric-field sensor 1105 and magnetic-field sensor 1110.

In one embodiment, the multi-axis vector sensor has co-located axes. In another embodiment, the multi-axis vector sensor has non-co-located axes, but the centers of the axes are positioned within $\frac{1}{10}$th of a wavelength at a frequency of interest.

In some embodiments, rotating the signals to the preferred axes is performed by physically rotating the multi-axis vector sensor so as to align one or more sensor axes with a preferred direction. In other embodiments, this rotation is performed by digitally rotating outputs of the multi-axis vector sensor so as to align one or more of the outputs with a preferred direction. Preferably, the preferred direction is a direction to a source of a signal of interest or a direction to a source of an interfering signal.

In some embodiments, the measurement apparatus is configured to receive a communications signal or a position, navigation, or timing signal. In some embodiments, the measurement apparatus is configured to find a direction to or a location of a source of an unknown signal.

The source of noise can be an unintentional interfering signal, at a near field or a far field, or an intentional jamming signal. The source of noise can be a narrow band interfering signal with a single frequency tone or multiple frequency tones or a broad band interfering signal. Also, the output of the multi-axis vector sensor can be calibrated or uncalibrated.

Based on the above, it should be readily apparent that the present invention provides an RF signal measurement system that is immune from jamming or other interfering signals, thereby enabling an optimal reconstruction of the originally transmitted signal. While certain preferred embodiments of the present invention have been set forth, it should be understood that various changes or modifications could be made without departing from the spirit of the present invention. In general, the invention is only intended to be limited by the scope of the following claims.

The invention claimed is:

1. A measurement apparatus comprising:
a multi-axis vector sensor including a first sensor configured to acquire a first signal along a first axis and a second sensor configured to acquire a second signal along a second axis; and
a controller configured to:
rotate the first signal to a first preferred axis and the second signal to a second preferred axis; and
then apply a frequency domain noise mitigation technique by:
determining correlations in the frequency domain between primary and reference channels over time, wherein the primary channel contains a desired signal and an interference signal, and the reference channel contains the interference signal; and
subtracting the reference channel from the primary channel to compute the desired signal.

2. The measurement apparatus of claim 1, wherein the reference channel contains the interference signal multiplied by a scaling factor, and applying the frequency domain noise mitigation technique further includes computing weighting coefficients for each frequency bin in the reference channel.

3. The measurement apparatus of claim 1, wherein the first and second sensors are electric-field sensors configured to measure an electric field along the first and second axes.

4. The measurement apparatus of claim 3, wherein the multi-axis vector sensor further includes a third sensor configured to acquire a third signal along the first axis and a fourth sensor configured to acquire a fourth signal along the second axis, and the third and fourth sensors are magnetic-field sensors configured to measure a magnetic field along the first and second axes.

5. The measurement apparatus of claim 1, wherein the multi-axis vector sensor has co-located axes.

6. The measurement apparatus of claim 1, wherein the first and second sensors are magnetic-field sensors configured to measure a magnetic field along the first and second axes.

7. The measurement apparatus of claim 6, wherein the multi-axis vector sensor further includes a single electric-field sensor configured to acquire a third signal along a third axis by measuring an electric field along the third axis.

8. The measurement apparatus of claim 1, wherein rotating the first signal to the first preferred axis and the second signal to the second preferred axis is performed by rotating the multi-axis vector sensor so as to align one or more sensor axes with a preferred direction, and the preferred direction is a direction to a source of a signal of interest or a direction to a source of an interfering signal.

9. The measurement apparatus of claim 1, wherein rotating the first signal to the first preferred axis and the second signal to the second preferred axis is performed by digitally rotating outputs of the multi-axis vector sensor so as to align one or more of the outputs with a preferred direction, and the preferred direction is a direction to a source of a signal of interest or a direction to a source of an interfering signal.

10. The measurement apparatus of claim 1, wherein the measurement apparatus is configured to:
receive a communications signal or a position, navigation, or timing signal; or
find a direction to or a location of a source of an unknown signal.

11. A method for reducing noise present in a signal measured by a measurement apparatus including a multi-axis vector sensor and a controller, wherein the multi-axis vector sensor includes a first sensor and a second sensor, the method comprising:
acquiring a first signal along a first axis with the first sensor;
acquiring a second signal along a second axis with the second sensor;

rotating the first signal to a first preferred axis and the second signal to a second preferred axis; and then applying a frequency domain noise mitigation technique by:

determining correlations in the frequency domain between primary and reference channels over time, wherein the primary channel contains a desired signal and an interference signal, and the reference channel contains the interference signal; and subtracting the reference channel from the primary channel to compute the desired signal.

12. The method of claim 11, wherein the reference channel contains the interference signal multiplied by a scaling factor, and applying the frequency domain noise mitigation technique further includes computing weighting coefficients for each frequency bin in the reference channel.

13. The method according to claim 11, wherein a source of the noise is an unintentional interfering signal at a near field or at a far field.

14. The method according to claim 11, wherein a source of the noise is an intentional jamming signal.

15. The method according to claim 11, wherein a source of the noise is a narrow band interfering signal with a single frequency tone or multiple frequency tones or a broad band interfering signal.

16. The method according to claim 11, wherein acquiring the first signal includes measuring an electric field along the first axis with the first sensor, and acquiring the second signal includes measuring the electric field along the second axis with the second sensor.

17. The method according to claim 16, wherein the multi-axis vector sensor further includes a third sensor and a fourth sensor, the method further comprising:

acquiring a third signal along the first axis with the third sensor by measuring a magnetic field along the first axis; and acquiring a fourth signal along the second axis with the fourth sensor by measuring the magnetic field along the second axis.

18. The method according to claim 11, wherein the multi-axis vector sensor has co-located axes.

19. The method according to claim 11, wherein acquiring the first signal includes measuring a magnetic field along the first axis with the first sensor, and acquiring the second signal includes measuring the magnetic field along the second axis with the second sensor.

20. The method according to claim 11, wherein rotating the first signal to the first preferred axis and the second signal to the second preferred axis is performed by rotating the multi-axis vector sensor so as to align one or more sensor axes with a preferred direction.

21. The method according to claim 20, wherein the preferred direction is a direction to a source of a signal of interest or a direction to a source of an interfering signal.

22. The method according to claim 11, wherein rotating the first signal to the first preferred axis and the second signal to the second preferred axis is performed by digitally rotating outputs of the multi-axis vector sensor so as to align one or more of the outputs with a preferred direction.

23. The method according to claim 22, wherein the preferred direction is a direction to a source of a signal of interest or a direction to a source of an interfering signal.

24. The method according to claim 11, further comprising:

receiving a communications signal with the measurement apparatus;

receiving a position, navigation, or timing signal with the measurement apparatus; or finding a direction to or a location of a source of an unknown signal with the measurement apparatus.

* * * * *